(12) United States Patent
Im

(10) Patent No.: US 11,936,234 B2
(45) Date of Patent: Mar. 19, 2024

(54) IN-VEHICLE INFOTAINMENT SYSTEM CONNECTED TO DIFFERENT TYPES OF USB DEVICES AND CHARGING METHOD PERFORMED BY INFOTAINMENT SYSTEM USING USB DEVICE AS INTERMEDIATE MEDIUM

(71) Applicant: HYUNDAI MOBIS CO., LTD., Seoul (KR)

(72) Inventor: Sang Un Im, Suwon-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 97 days.

(21) Appl. No.: 17/852,848

(22) Filed: Jun. 29, 2022

(65) Prior Publication Data

US 2023/0138849 A1 May 4, 2023

(51) Int. Cl.
*H02J 7/00* (2006.01)
*G06F 13/42* (2006.01)

(52) U.S. Cl.
CPC .... *H02J 7/007188* (2020.01); *G06F 13/4282* (2013.01); *H02J 7/00032* (2020.01); *G06F 2213/0042* (2013.01)

(58) Field of Classification Search
CPC .......... G06F 13/4282; G06F 2213/0042; H02J 7/00032; H02J 7/00034; H02J 7/00045; H02J 7/007188
See application file for complete search history.

(56) References Cited

U.S. PATENT DOCUMENTS

| 2012/0313571 | A1* | 12/2012 | Knowlton | ............... | H02J 7/007 320/107 |
| 2014/0159645 | A1* | 6/2014 | Wyskiel | ................ | H02J 7/0042 320/107 |
| 2017/0005494 | A1* | 1/2017 | Li | ......................... | H02J 7/0013 |
| 2017/0222459 | A1* | 8/2017 | Kang | .................... | H02J 7/0042 |

FOREIGN PATENT DOCUMENTS

| KR | 2013-0070336 A | 6/2013 |
| KR | 10-1294102 B1 | 8/2013 |

* cited by examiner

*Primary Examiner* — Levi Gannon
(74) *Attorney, Agent, or Firm* — NovoTechIP International PLLC

(57) ABSTRACT

Disclosed is an in-vehicle infotainment (IVI) system connected to a USB device by a USB cable. The IVI system includes a USB charging unit outputting internal power for low-speed charging, a switch unit outputting external power for high-speed charging, and a micro controller unit determining a USB connector type of a USB device according to a connector identification signal received from the USB device through the USB cable and controlling an operation of the USB charging unit and the switch unit to transfer the internal power or the external power to the USB device through the USB cable according to a result of determining the USB connector type.

16 Claims, 3 Drawing Sheets

IN-VEHICLE INFOTAINMENT SYSTEM CONNECTED TO DIFFERENT TYPES OF USB DEVICES AND CHARGING METHOD PERFORMED BY INFOTAINMENT SYSTEM USING USB DEVICE AS INTERMEDIATE MEDIUM

CROSS-REFERENCE TO RELATED APPLICATIONS

This application claims the benefit of priority to Korean Patent Application No. 10-2021-0146095 filed on Oct. 28, 2021, which is hereby incorporated by reference in its entirety.

BACKGROUND

1. Technical Field

The present invention relates to a charging technology performed by an infotainment system for a vehicle using different types of USB devices as an intermediate medium.

2. Discussion of Related Art

Recently released vehicles essentially include an in-vehicle infotainment (IVI) system. Such an infotainment system may further provide a charging function of an external device in addition to an audio function, a video function, and a navigation function.

In order to provide a charging function of an external device, the infotainment system may be connected to an external device through a USB device serving as a gender. That is, a battery installed in the external device may be charged by power supplied from the infotainment system via an intermediate medium such as a USB device.

A USB device acting as a gender does not have a charging function and simply serves to bypass power supplied from the infotainment system and data related to charging.

The infotainment system and the USB device are connected by a USB cable, and it is difficult to fast charge more than 3 amperes (A) due to a voltage drop by the USB cable.

In addition, in order to charge the external device, the external device and the USB device are mainly connected by USB TYPE C charging cable. Accordingly, the USB device is designed to have a USB TYPE C connector that may be connected to the USB TYPE C charging cable. However, the USB TYPE C connector does not satisfy a charging current standard of 3 amperes (A) or more for high-speed charging.

SUMMARY

An aspect of the present invention is directed to providing an in-vehicle infotainment system that may be connected to different types of USB devices, regardless of a connector type of a USB device, to provide a user's desired high-speed or low-speed charging, and a method of connecting different types of USB devices to the infotainment system.

To achieve these and other advantages and in accordance with the purpose of the invention, as embodied and broadly described herein, there is provided a charging method performed by an in-vehicle infotainment (IVI) system including a USB charging unit transferring internal power for low-speed charging to a USB device through a USB cable and a switch unit transferring external power for high-speed charging to the USB device through the USB cable, including: determining, by a microcontroller unit included in the IVI system, a USB connector type of the USB device according to a connector identification signal received from the USB device; and controlling, by the micro controller unit, an operation of the USB charging unit and the switch unit to transfer the internal power or the external power to the USB device through the USB cable according to a result of determining the USB connector type.

In another aspect of the present invention, there is provided an in-vehicle infotainment (IVI) system including: a USB charging unit outputting internal power for low-speed charging; a switch unit outputting external power for high-speed charging; and a micro controller unit determining a USB connector type of a USB device according to a connector identification signal received from the USB device through the USB cable and controlling an operation of the USB charging unit and the switch unit to transfer the internal power or the external power to the USB device through the USB cable according to a result of determining the USB connector type.

When the USB connector type is determined as a USB A TYPE (a.k.a., USB type A) supporting the low-speed charging, the USB charging unit may be enabled according to an enable signal from the microcontroller unit, and the enabled USB charging unit transfers the internal power to the USB device through a power supply line included in the USB cable.

When the USB connector type is determined as the USB A TYPE supporting the low-speed charging, the switch unit may perform a turn-off operation according to a control signal from the microcontroller unit to cut off a connection between the external power and the power supply line included in the USB cable.

When the USB connector type is determined as a USB C TYPE (a.k.a., USB type C) supporting the high-speed charging, the USB charging unit may be disabled according to a disable signal from the microcontroller unit, and an operation mode of the disabled USB charging unit may be switched to a bypass mode in which a charging operation is not performed.

When the USB connector type is determined as the USB C TYPE supporting the high-speed charging, the switch unit may perform a turn-on operation according to a control signal from the microcontroller unit to transfer the external power to the power supply line included in the USB cable.

The IVI system may further include: a connector connected to the USB device by the USB cable; and an ideal diode including a positive terminal connected to the USB charging unit and a negative terminal connected to the connector, wherein when the external power output from the switch unit is transferred to a power supply line connecting the negative terminal to the connector under the control of the microcontroller unit, the ideal diode may serve to cut off a current flowing to the USB charging unit to prevent the USB charging unit from being damaged by the external power.

The IVI system may further include: a current sensor sensing a current value flowing in a power supply line included in the USB cable, wherein the microcontroller unit may diagnose a connector connection state between a connector of the USB device based on the USB cable and a connector of the infotainment system based on the current value.

The USB cable may be a USB 2.0 cable.

It is to be understood that both the foregoing general description and the following detailed description of the present invention are exemplary and explanatory and are intended to provide further explanation of the invention as claimed.

DETAILED DESCRIPTION

Figure 1:
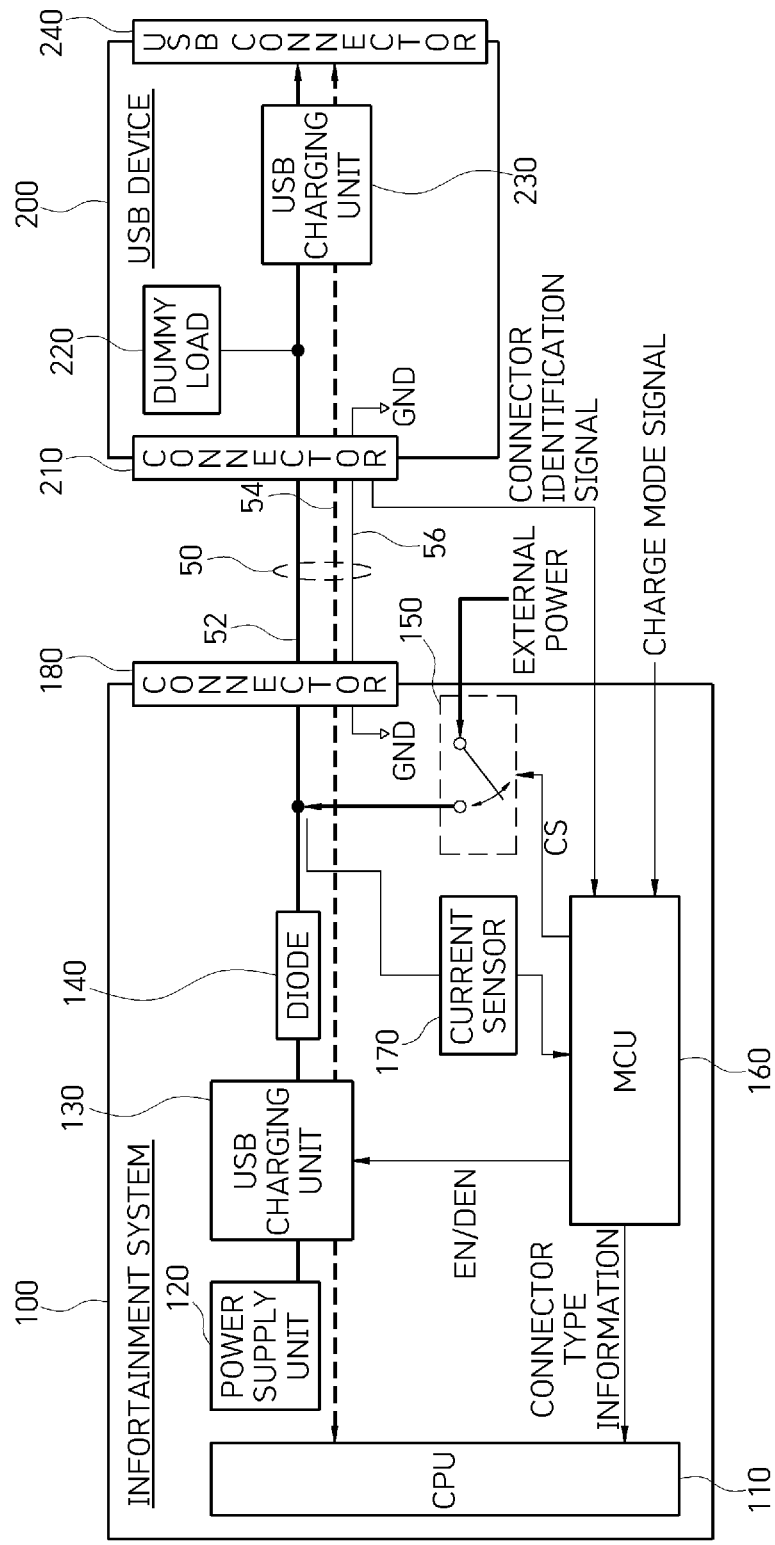
FIG. 1 is a block diagram schematically showing a configuration of an overall system according to an embodiment of the present invention.

Hereinafter, embodiments of the present invention will be described in detail to be easily embodied by those skilled in the art with reference to the accompanying drawings. The present invention may, however, be embodied in many different forms and should not be construed as being limited to the embodiments set forth herein. The present invention may, however, be embodied in many different forms and should not be construed as being limited to the embodiments set forth herein. In the accompanying drawings, a portion irrelevant to a description of the present invention will be omitted for clarity. Like reference numerals refer to like elements throughout. Also, in providing description with reference to the drawings, although elements are represented by the same name, reference numeral referring to the elements may be changed, and reference numerals are merely described for convenience of description. It should not be construed that concepts, features, functions, or effects of elements are limited by reference numerals.

FIG. 1 is a block diagram schematically showing a configuration of an overall system according to an embodiment of the present invention.

Referring to FIG. 1, an overall system 300 according to an embodiment of the present invention includes an in-vehicle infotainment system 100 (hereinafter, referred to as an 'infotainment system') and a USB device 200.

The infotainment system 100 is a system built in a dashboard of a vehicle and may be referred to as an 'audio, video, navigation (AVN) unit' or a 'head unit'.

The infotainment system 100 provides, an operation function related to vehicle driving and a charging function, in addition to an audio function, a video function, and a navigation function, and the present invention focuses on the charging function among the functions provided by the infotainment system 100.

The USB device 200 may be called a kind of USB gender that connects an external device such as a smartphone to the in-vehicle infotainment system 100. The USB device 200 transfers charge power supplied from the infotainment system 100 to an external device (e.g., a smartphone).

The USB device 200 supports high-speed charging or low-speed charging according to a connector type connected to an external device. For example, when the USB connector type is a USB A TYPE (a.k.a., USB type A), the USB device 200 supports low-speed charging, and when the USB connector type is a USB C TYPE (a.k.a., USB type C), the USB device 200 supports high-speed charging.

The infotainment system 100 may selectively support any one of the high-speed charging and the low-speed charging without changing a design. That is, both high-speed charging and low-speed charging may be supported regardless of a connector type (a connector type connected to an external device) of the USB device 200.

To this end, the infotainment system 100 may include a central processing unit (CPU) 110, a power supply unit 120, a USB charging unit 130, an ideal diode 140, a switch unit 150, a microcontroller (MCU) 160, a current sensor 170, and a connector 180.

The CPU 110 controls and manages AN operation of at least one of the peripheral components 120 to 180. To this end, the CPU 110 exchanges data with the at least one component and processes data received from the at least one component.

The power supply unit 120 is a device that outputs power for low-speed charging of an external device (e.g., a smartphone) connected to the USB device 200 via the USB device 200 and may output power of, for example, 5V for low-speed charging.

The USB charging unit 130 is enabled or disabled according to an enable (EA) signal or a disable (DA) signal from the MCU 160.

When the USB charging unit 130 is enabled, the USB charging unit 130 transfers power (e.g., 5V power for low-speed charging) supplied from the power supply unit 120, and at the same time transfers USB communication data (e.g., data related to charging) transferred from the CPU 110 to an external device (not shown) connected to the USB connector 240 of the USB device 200 via the USB device 200. Here, the USB charging unit 130 may configure the USB communication data to include information related to a maximum charging current that may be provided during low-speed charging or high-speed charging, and transmit the USB communication data to the external device.

Although not shown, the USB charging unit 130 may include, for example, a power converter and a controller for controlling the power converter.

The power converter steps up or steps down power for low-speed charging output from the power supply unit 120 under the control of the controller. The controller serves to control the power converter, appropriately process the USB communication data transferred from the CPU 110, and transfers the processed USB communication data to an external device via the USB device 200. At this time, the controller configures the USB communication data to include information related to the maximum charging current, and transfers the USB communication data to the external device via the USB device 200, thereby notifying the external device of the maximum charging current that the USB charging unit may supply.

When the USB charging unit 130 is disabled, the USB charging unit 130 does not perform a charging operation (e.g., a low-speed charging operation) and bypasses data related to charging exchanged with the USB device 20 or an external device connected to the USB connector 240 of the USB device 200. That is, the disabled USB charging unit 130 operates in a bypass mode.

The ideal diode 140 is a semiconductor device connected between the USB charging unit 130 and the connector 180. A positive electrode of the ideal diode 140 is connected to the USB charging unit 130, and a negative electrode of the ideal diode 140 is connected to the connector 180.

When a forward bias voltage is applied to both ends of the ideal diode 140, current flows from the positive electrode to the negative electrode without a voltage drop, and conversely, when a reverse bias voltage is applied to both ends, no current flows. That is, when power for low-speed charging output from the USB charging unit 130 is applied to the positive electrode of the ideal diode 140, power for low-speed charging is transferred to the connector 180 without a voltage drop.

When an external power higher than the power for low-speed charging is applied to the negative electrode of the ideal diode 140, current does not flow, and thus preventing the USB charging unit 130 from being damaged by an overvoltage according to the external power. Meanwhile, the external power may be a power used during high-speed charging, and may be, for example, a 12V power.

The ideal diode 140 may be replaced with a field effect transistor (FET) having a body diode, and the FET may perform a switching operation according to a control signal from the MCU 160 to be described later. The ideal diode 140 may be excluded from the design if the USB charging unit 130 can be protected from an overvoltage in a disabled state.

The switch unit 150 is a device that transfers external power applied from an external power device (not shown) to a power line connecting the negative electrode of the ideal diode 140 and the connector 180. Here, the external power device may be, for example, a vehicle battery that provides power of 12V.

The switch unit 150 performs a switching operation (a turn-on operation or a turn-off operation) in response to a control signal (EN: enable) 161 from the MCU 160. According to the switching operation, the switch unit 150 may transfer the external power for high-speed charging to a power line connecting the negative electrode of the ideal diode 140 and the connector 180.

Since the external power for high-speed charging is not transferred to the USB charging unit 130 by the ideal diode 140, it is transferred to the USB device 200 through a USB cable 50, which will be described later.

The MCU 160 generates a control signal (CS) for controlling a switching operation of the switch unit 150 described above according to a charging mode signal received from an external device. The charging mode signal includes a high-speed charging mode signal indicating high-speed charging and a low-speed charging mode signal indicating low-speed charging.

When the MCU 160 receives a high-speed charging mode signal from an external device, the MCU 160 transfers a control signal EN for instructing a turn-on operation of the switch unit 150 to the switch unit 150, and when the MCU 160 receives a low-speed charging mode signal from the external device, the MCU 160 transfers a control signal EN for instructing a turn-off operation of the switch unit 150 to the switch unit 150.

The switch unit 150 performs a turn-on operation according to a control signal CS for instructing the turn-on operation from the MCU 160 and transfers an external power for high-speed charging to a power line connecting the negative electrode of the ideal diode 140 to the connector 180.

The switch unit 150 cuts off transmission of external power for high-speed charging by performing a turn-off operation according to the control signal EN for instructing the turn-off operation from the MCU 160. When the transmission of the external power for high-speed charging is cut off, power for low-speed charging output from the power supply unit 120 may be transferred to the USB device 200 by way of the ideal diode 140 and the connector 180.

The external device providing the charging mode signal may be a wiring harness connected to a car body or a chassis. In this case, a car body or a chassis serves as a ground. In this case, the charging mode signal is utilized as a ground signal, and the ground signal is used as a charging mode signal indicating high-speed charging.

In a state in which the MCU 160 and the wiring harness are not connected, the MCU 160 transfers a control signal CS for instructing a turn-off operation to the switch unit 150, thereby cutting off transmission of an external power for high-speed charging.

As such, the infotainment system 100 performs high-speed charging when connected to the vehicle body or chassis by a wiring harness, and performs low-speed charging when not connected to the vehicle body or chassis by a wiring harness.

The MCU 160 may generate a control signal CS for controlling the switching operation of the switch unit 150 described above according to a connector identification signal received from the USB device 200. The connector identification signal is a signal for identifying a USB connector type supported by the USB device 200, and includes a connector identification signal indicating USB A TYPE and a connector identification signal indicating USB C TYPE.

The USB device 200 having the USB A TYPE USB connector 240 supports low-speed charging, and the USB device 200 having the USB C TYPE USB connector 240 supports high-speed charging.

The MCU 160 transfers a control signal for instructing a turn-off operation to the switch unit 150 according to a connector identification signal indicating USB A TYPE, and transfers a control signal for instructing a turn-on operation to the switch unit 150 according to a connector identification signal indicating USB C TYPE.

The MCU 160 detects connector type information (or charging type information) of the USB device 200 according to the connector identification signal received from the USB device 200 and transfers the detected connector type information to the CPU 110.

The CPU 110 generates USB communication data to include connector type information (or charging type information) from the MCU 160 and transfers the generated USB communication data to the USB charging unit 130.

The USB charging unit 130 configures to further include maximum charging current information according to connector type information (or charging type information) in the USB communication data transferred from the CPU 110 and then transfers the same to an external device (e.g., a smartphone) connected to the USB device 200.

In addition, when the MCU 160 recognizes a situation requiring high-speed charging according to the connector identification signal or the charging mode signal, the MCU 160 transfers a disable signal DEN for switching an operation mode of the USB charging unit 130 (or a controller of the USB charging unit 130) to a bypass mode to the USB charging unit 130.

When the USB charging unit 130 is switched to the bypass mode, the USB charging unit 130 serves only to transfer data transferred from the USB charging unit 230 in the USB device 200 to be described later to the CPU 110 as it is. That is, the USB charging unit 130 switched to the bypass mode does not perform any processing on data transferred from the USB charging unit 230 in the USB device 200 as well as an operation related to charging.

As such, a reason for switching the USB charging unit 130 to the bypass mode is to prevent a degradation of a data communication line 54 connecting the USB charging unit 130 and the USB charging unit 230 in the USB device 200 due to mutual interference of the USB charging unit 130 and the USB charging unit 230.

When the connector 180 of the infotainment system 100 and the connector 210 of the USB device 200 are connected, the current sensor 170 senses the connector connection state. For example, the current sensor 170 senses a current value flowing through the power supply line 52 included in the USB cable 50 to be described later, and transfers the sensed value to the MCU 160.

The MCU 160 may diagnose the connector connection state between the infotainment system 100 and the USB device 200 based on the sensed value transferred from the current sensor 170, and provide a diagnosis result to the user. For example, when the sensed value is less than a reference value, the MCU 160 may diagnose the connector connection state as an abnormal state, and in the opposite case, the MCU 160 may diagnose the connector connection state as a normal state. The diagnosis result may be displayed through a display device (not shown) provided in the infotainment system 100.

Meanwhile, in the embodiment described above, the MCU 160 generates the control signal CS and the enable/disable signal EA/DA for controlling the switching operation of the switch unit 150 based on the connector identification signal or the charging mode signal, but the MCU 160 may also generate the control signal CS and the enable/disable signal EA/DA according to a user input input through the display device. In this case, the display device may display an input button for selecting high-speed charging or low-speed charging.

Hereinafter, an internal configuration of the USB device 200 will be described.

The USB device 200 includes a connector 210, a dummy load 220, a USB charging unit 230, and a USB connector 240.

The connector 210 is connected to the connector 180 of the infotainment system 100 by a USB cable 50. Here, the USB cable 50 may be, for example, a low-cost USB 2.0 cable. In this case, the infotainment system 100 and the USB device 200 perform data communication based on a USB 2.0 communication method.

As such, the present invention provides an effect of supporting both low-speed charging and high-speed charging using a low-cost USB 2.0 cable, regardless of the USB connector specification of the USB device 200.

The USB cable 50 includes a power supply line 50, a data communication line 54, and a ground line 56.

Through the power supply line 50, the infotainment system 100 may transmit power for low-speed charging (e.g., 5V) or power for high-speed charging (e.g., 12V) to the USB device 200. The power supply unit 120, the USB charging unit 130, and the ideal diode 140 included in the infotainment system 100 and the USB charging unit 230 included in the USB device 200 are connected by the power supply line 50.

The infotainment system 100 and the USB charging unit 230 may exchange charging-related data by the data communication line 54. For example, the USB charging unit 110 may transmit a maximum charging current value to the USB charging unit 230 through the data line 54.

The CPU 110, the USB charging unit 130, and the USB charging unit 230 are connected by the data communication line 54.

In addition, the USB cable 50 may further include an additional line for transmitting the connector identification signal to the MCU 160 in the infotainment system 100. Alternatively, the connector identification signal may be transferred to the MCU 160 through the data communication line 54, in which case the design of the additional line is unnecessary.

The dummy load 220 is connected to a power supply line connecting the connector 210 and the USB charging unit 230, and serves to constantly consume current flowing through the power supply line to diagnose the connector connection state. The dummy load 220 may be, for example, a resistor.

Although not shown, the USB charging unit 230 may include a power converter and a controller.

The power converter converts (steps up or steps down) power for low-speed charging or power for high-speed charging transferred from the infotainment system 100 through the connector 210 under the control of the controller, and transfers the converted power to an external device (e.g., a smartphone) connected to the USB connector 240.

The controller controls the operation of the power converter and, at the same time, exchanges data (e.g., a maximum charging current value, a connector identification signal, etc.) related to charging with the CPU 100 or the USB charging unit 130 included in the infotainment system 100, and transfers the exchanged data to an external device connected to the USB connector 240.

The USB connector 240 is a connector for connecting the USB device 200 and an external device (e.g., a smartphone), and may be a USB A TYPE supporting low-speed charging or a USB C TYPE supporting high-speed charging.

Figure 2:
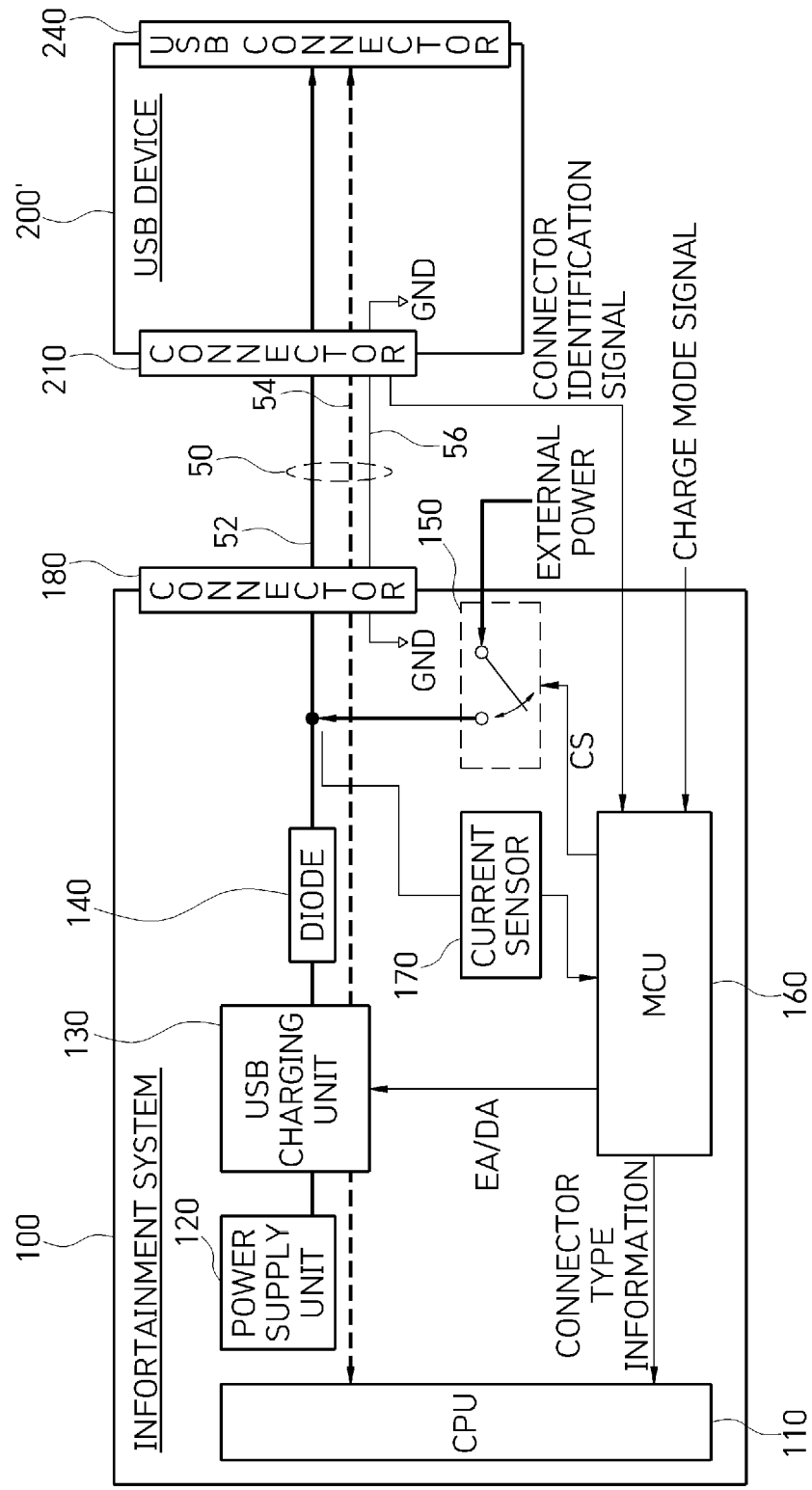
FIG. 2 is a block diagram schematically showing a configuration of an overall system according to another embodiment of the present invention.

FIG. 2 is a block diagram schematically showing a configuration of an overall system according to another embodiment of the present invention.

Referring to FIG. 2, the overall system according to another embodiment of the present invention includes an infotainment system 100' and a USB device 200'.

The infotainment system 100' according to another embodiment of the present invention is the same as the infotainment system 100 shown in FIG. 1. Accordingly, a description of the infotainment system 100' according to another embodiment of the present invention is replaced with the description of the infotainment system 100 shown in FIG. 1.

However, the USB device 200' according to another embodiment of the present invention is different from the USB device 200 illustrated in FIG. 1 in that it does not include such a module as the USB charging unit 230 shown in FIG. 1 but operates as a bypass type.

Since the USB device 200' operating in the bypass type does not include a special hardware component, the USB device 200' has a small size and may be used as a USB device occupying a minimum space in a vehicle.

The MCU 160 detects a USB connector type of the USB device 200' based on any one information among a connector identification signal received from the USB device 200' operating as a bypass type, a charging mode signal received from a wiring harness, and a user input.

The MCU 160 controls the switching operation of the switch unit 150 and at the same time enables or disables the USB charging unit 130 according to the detected USB connector type.

In addition, the MCU 160 configures the detected USB connector type as USB connector type information and transfers the USB connector type information to the CPU 110, and the CPU 110 transfers a maximum current value that may be provided during low-speed charging or high-speed charging to an external device (e.g., a smartphone) connected to the USB connector of the USB device 200'.

As such, even when the infotainment system 100' according to another embodiment of the present invention is linked with the USB device 200' operating as the bypass type, low-speed charging or high-speed charging may be freely selected to perform charging on the external device (e.g., a smartphone) connected to the USB device 200'.

Figure 3:
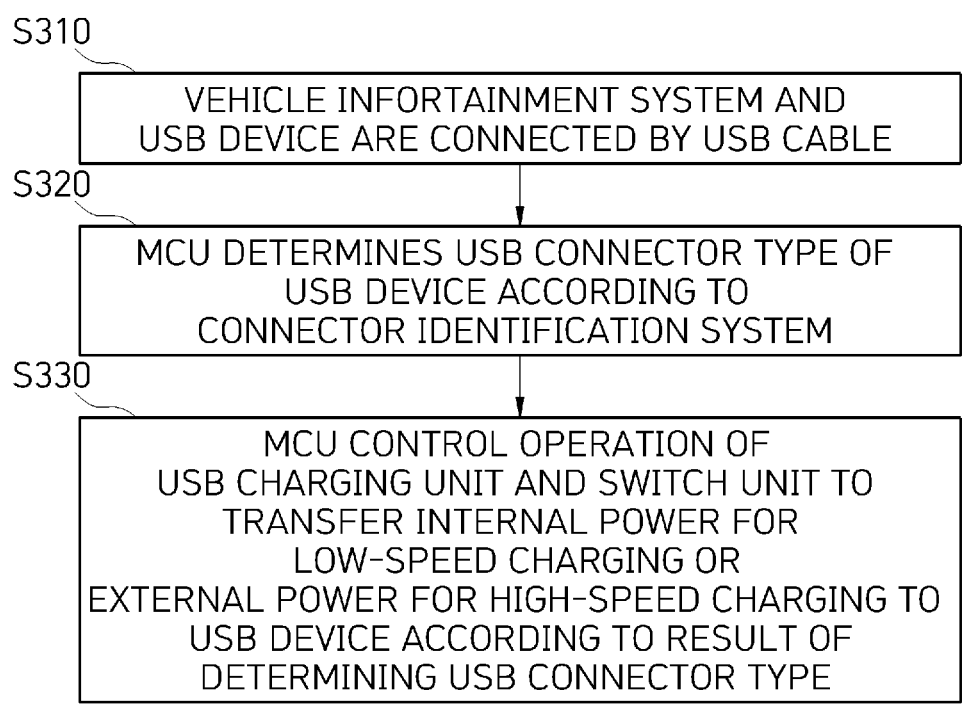
FIG. 3 is a flowchart illustrating a charging method performed by an in-vehicle infotainment system using different types of USB devices as an intermediate medium according to an embodiment of the present invention.

FIG. 3 is a flowchart illustrating a charging method performed by the in-vehicle infotainment system using different types of USB devices as an intermediate medium according to an embodiment of the present invention.

Referring to FIG. 3, in step S310, the connector 180 of the in-vehicle infotainment system 100 and the connector 210 of the USB device 200 are connected by the USB cable 50.

Next, in step S320, the MCU 160 determines a USB connector type of the USB connector 240 included in the USB device 200 according to the connector identification signal received from the USB device 200 through the USB cable 50.

Next, in step S330, the MCU 160 controls the operation of the USB charging unit 130 and the switch unit 150 to transfer the internal power or the external power to the USB device 200 through the USB cable 50 according to a result of determining the USB connector type.

In an embodiment, after step S330, when the USB connector type is determined as a USB A TYPE supporting the low-speed charging, a step of enabling the USB charging unit 130 under the control of the MCU 160 and a step of transferring the internal power from the enabled USB charging unit 130 to the USB device 200 through the power supply line 52 included in the USB cable 50 may be further performed.

In an embodiment, before or after the step of controlling the operation of the USB charging unit 130 and the switch unit 150, when the USB connector type is determined as the USB C TYPE supporting the high-speed charging, a step of disabling the USB charging unit 130 under the control of the MCU and a step of performing a turn-on operation under the control of the MCU 160 for the switch unit 150 to transfer the external power to the USB device 200 through the power supply line 52 included in the SUB cable 50 may be further performed.

In an embodiment, the step of disabling the USB charging unit under the control of the microcontroller unit may include switching an operation mode of the USB charging unit to a bypass mode in which a charging operation is not performed.

In an embodiment, the in-vehicle infotainment system further includes a central processing unit, and a step of transferring, by the MCU, a result of determining the USB connector type to the CPU and a step of transferring, by the CPU, a maximum charging current value that may be provided in the low-speed charging or the high-speed charging to the USB device 200 and an external device (e.g., a smartphone) connected to the USB device 200 through a data communication line included in the USB cable based on a result of determining the USB connector type may be further performed.

In an embodiment, the in-vehicle infotainment system may further include a current sensor 170, and before the step of determining the USB connector type of the USB device 200, a step of sensing a current value, by the current sensor 170, a current value flowing in the USB cable 50 in a state in which the connector 180 of the infotainment system 100 and the connector 210 of the USB device 200 are connected by the USB cable 50 to the MCU 160 and a step of diagnosing, by the MCU, a connector connection state between the connector 180 of the infotainment system 100 and the connector 210 of the USB device 200 based on the current value may be further performed.

In an embodiment, a step of transferring, by the MCU 160, information indicating the connector connection state to the CPU 110 and converting, by the CPU 110, the information indicating the connector connection state into visual information and displaying the visual information on a display device (not shown) included in the in-vehicle infotainment system 100 may be further performed.

According to the present invention, an in-vehicle infotainment system may freely perform low-speed or high-speed charging desired by a user for an external device (e.g., a smartphone) connected to different types of USB devices, regardless of a connector type (or charging type) of the different types of USB devices.

The method described above may be implemented as a hardware module executed by a processor, a software module, or a combination thereof. Here, the processor may include at least one GPU or at least one CPU.

A software module may reside in a storage medium (i.e., memory and/or storage) such as RAM memory, flash memory, ROM memory, EPROM memory, EEPROM memory, registers, hard disk, a removable disk, a CD-ROM.

A storage medium may be, for example, connected to a processor, and the processor may read information from the storage medium and write information to the storage medium. Alternatively, the storage medium may be integral with the processor.

The processor and storage medium may reside within an application specific integrated circuit (ASIC). The ASIC may reside within a vehicle.

Example methods of the present disclosure are expressed as a series of operations for clarity of description but not intended to limit the order in which the steps are performed, and if necessary, each step may be performed simultaneously or in a different order.

The exemplary embodiments disclosed herein should be considered in an illustrative aspect rather than a restrictive aspect. The scope of the present invention is shown in the claims rather than the foregoing description, and all differences within the equivalent range should be interpreted as being included in the present invention.

What is claimed is:

1. A method of operating an in-vehicle infotainment (IVI) system connected to a USB device through a USB cable, the IVI system including (1) a USB charging unit configured to transfer, to the USB device through the USB cable, internal power of the IVI system for low-speed USB charging, and (2) a switch unit configured to transfer, to the USB device through the USB cable, external power transferred to the IVI system for high-speed USB charging, the method comprising:
receiving, from the USB device through the USB cable, connector identification data;
determining, based on the received connector identification data, a connector type of the USB device; and
controlling, based on the determined connector type of the USB device, the USB charging unit and the switch unit to transfer the internal power or the external power to the USB device through the USB cable.

2. The method of claim 1, wherein controlling the USB charging unit and the switch unit comprises, in response to determining that the connector type of the USB device is a USB type A, controlling the USB charging unit to transfer the internal power to the USB device through a power supply line of the USB cable.

3. The method of claim 2, wherein controlling the USB charging unit and the switch unit further comprises, in response to determining that the connector type of the USB device is a USB type A, controlling the switch unit to disconnect a power transfer connection between the external power and the power supply line of the USB cable.

4. The method of claim 1, wherein controlling the USB charging unit and the switch unit comprises:
   in response to determining that the determined connector type of the USB device is a USB type C, disabling the USB charging unit; and
   controlling the switch unit to transfer the external power to the USB device through a power supply line of the USB cable.

5. The method of claim 4, wherein disabling the USB charging unit includes controlling the USB charging unit to operate in a bypass mode.

6. The method of claim 1, further comprising:
   determining, based on the determined connector type of the USB device, a maximum charge current value available for the low-speed charging or the high-speed charging; and
   transferring, to the USB device and an external device connected to the USB device through a data communication line of the USB cable, data including the determined maximum charge current value.

7. The method of claim 1, wherein:
   the IVI system further includes a current sensor and a first connector,
   the USB device includes a second connector,
   the USB cable is connected between the first and second connectors, and
   the method further comprises:
      controlling the current sensor to detect a current value of a current flowing through the USB cable; and
      diagnosing, based on the detected current value, a connector connection between the first and second connectors.

8. The method of claim 7, further comprising displaying, through a display of the IVI system, information indicating the diagnosed connector connection between the first and second connectors.

9. An in-vehicle infotainment (IVI) system comprising:
   a USB charging unit configured to transfer internal power of the IVI system for low-speed charging;
   a switch unit configured to transfer external power transferred to the IVI system for high-speed charging; and
   a controller configured to:
      receive, from a USB device through a USB cable connected between the IVI system and the USB device, connector identification data;
      determine, based on the received connector identification data, a connector type of the USB device; and
      control, based on the determined connector type of the USB device, the USB charging unit and the switch unit to transfer the internal power or the external power to the USB device through the USB cable.

10. The IVI system of claim 9, wherein the controller is further configured to, in response to determining that the connector type is a USB type A, control the USB charging unit to transfer the internal power to the USB device through a power supply line of the USB cable.

11. The IVI system of claim 9, wherein the controller is further configured to, in response to determining that the determined connector type is the USB type A, control the switch unit to disable a power transfer connection between the external power and a power supply line of the USB cable.

12. The IVI system of claim 9, wherein the controller is further configured to, in response to determining that the determined connector type is a USB type C, control the USB charging unit to operate in a bypass mode.

13. The IVI system of claim 9, wherein the controller is further configured to, in response to determining that the connector type is the USB type C, control the switch unit to transfer the external power to a power supply line of the USB cable.

14. The IVI system of claim 9, further comprising:
   a connector connected to the USB cable; and
   an ideal diode including a first terminal connected to the USB charging unit and a second terminal connected to the connector,
   wherein the ideal diode is configured, when the external power output from the switch unit is transferred to a power supply line connecting the second terminal of the ideal diode to the connector, to cut off current flow to the USB charging unit.

15. The IVI system of claim 9, further comprising:
   a first connector connected to the USB cable; and
   a current sensor configured to detect a current value of a current flowing in a power supply line of the USB cable,
   wherein the USB device comprises a second connector connected to the USB cable, and
   wherein the controller is configured to diagnose, based on the detected current value, a connector connection between the first connector of the IVI and the second connector of the USB device.

16. The IVI system of claim 9, wherein the USB cable includes a USB 2.0 cable.

* * * * *